May 14, 1963 G. KIRSCHEY 3,089,350
CONTINUOUSLY CONTROLLABLE FRICTION WHEEL-EPICYCLIC GEAR DRIVE
Filed Dec. 11, 1961 2 Sheets-Sheet 2

INVENTOR
Gerhard Kirschey
By Ernest Montague
Attorney

3,089,350
CONTINUOUSLY CONTROLLABLE FRICTION WHEEL-EPICYCLIC GEAR DRIVE
Gerhard Kirschey, Baumhof 12, Wuppertal-Barmen, Germany
Filed Dec. 11, 1961, Ser. No. 158,430
Claims priority, application Germany Nov. 10, 1961
15 Claims. (Cl. 74—796)

The present invention relates to a continuously controllable friction wheel-epicyclic gear drive, in general, and to such gear drive having an inner sun consisting of at least two inner rings and driven by a drive shaft over a coupling, and an outer sun consisting likewise of at least two outer rings, of which one ring is immovably mounted in a housing and the other ring is axially adjustable, and still having flat sun and planet gears forming double-cones which engage the inner rings constituting the inner sun, as well as the outer rings constituting the outer sun, and which are furthermore mounted radially adjustable in a driven disk coupled with the driven shaft of the gear drive.

In friction wheel-epicyclic gear drives of the type set forth above it is known to use a moment coupling for the purpose of transmitting the power flow to the inner sun from the drive shaft of the gear drive with the creation of a predetermined engagement pressure which is dependent upon the rotary moment, which inner sun in turn transmits the forces by means of the planet wheels engaging the inner rings, as well as the outer rings to a driven disk, and thereby, to the driven shaft.

The most different couplings have been known for such force transmissions. Thus, for instance, couplings are known which have no axial movement, and which are rather operated by outer setting members. Such couplings produce, however, forces which are constantly proportional only to the driving rotary moment, and sometimes also a very short axial movement due to the elastic deformation of the setting members.

In addition, couplings have also been known, which have an axial movement, whereby such couplings can operate, for instance, with sliding cams or in a similar manner. In this case, however, a high friction and, thus, a high dispersion of the engaging pressure forces takes place. Furthermore this sliding movement causes self-locking starting at a predetermined angle in one direction.

Finally, couplings have also been proposed with balls or rollers as transmission members between two coupling disks, since it has been found that at small and flat angles the rolling friction is more favorable to prevent the self-locking. Such coupling finds its application in a friction wheel-epicyclic gear drive of the above-stated type. For the transmission of the great forces, it is rather required in connection with such drives, that the angles of the control curves of the coupling disks, which cooperate with the balls or rollers, are as much as possible small and flat, since the axial pressure component is proportional to the angle, that means, the smaller the angle, the greater the axial pressure.

In such coupling the force is transmitted from one-half of the disk of the coupling by means of the balls or rollers to the adjacent disk, whereby the two coupling disk halves are axially recessed within the range of the balls or rollers opposite each other with the formation of a control curve parallel relative to each other, by raising both control curves equally with a predetermined constant angle from a lowermost point.

In a coupling set forth above, it is, however, possible that the rollers or bolts are disposed already at the head of the curve of one coupling disk half at a certain setting, so that upon re-setting of the coupling, which sets itself automatically, caused by the re-setting of the planet gears for a change of the number of revolutions of the driven shaft, the balls or rollers cannot roll any more relative to the adjacent coupling disk half, since it has already reached the lowermost point of a control curve. In such case, the control curve of the adjacent coupling disk half slides over the balls or rollers and causes thereby a non-desirable self-locking.

Furthermore, this coupling set forth above can have only control flanks with a constant rising angle; because in case this rising angle is not constant, the two control flanks of the two coupling disk halves are not disposed parallel towards each other, rather they form an angle towards each other and thus operate like a wedge and attempt to push the balls or rollers in one direction.

It is, therefore, one object of the present invention to provide a coupling, which avoids the known drawback, and which in a preferred application, but not exclusively, can be used in connection with friction wheel-epicyclic gear drives.

It is another object of the present invention to provide a continuously controllable friction wheel-epicyclic gear drive, in which one side of the coupling comprises a plurality of coupling bolts mounted on roller bearings in a receiving body, which coupling bolts in turn cooperate with a control curve of a complementary coupling member relatively rotatable thereto.

It is still another particularly preferred object of the present invention to provide a continuously controllable friction wheel-epicyclic gear drive, wherein the coupling bolts are mounted on roller bearings in radial bores of a receiving body of about disk-shape which is coupled with the drive means, a complementary coupling part carrying the control curve and being axially coordinated to the receiving body, whereby in the receiving body for the coupling bolts, for instance at least two coupling bolts are disposed, which can have needle bearings, and the receiving body has on the side disposed opposite the control curve an annular recess for reception of the control curve. Furthermore, each of the coupling bolts can be mounted on roller bearings by means of two needle bearings, which can be provided near the bolt ends by leaving a needle-free space in the center thereof.

A practical embodiment of this coupling brings about in the practical application the great advantage, that in spite of the use of small and flat angles on the control curve a self-locking cannot occur even then, when the bolts are in a position which normally would enhance a self-locking, rather due to the rolling friction of the bolts, by means of the roller bearings, the adjustment and setting possibility of the coupling is always retained.

In this coupling the normally required second coupling half with the complementary control curve is also not required. The latter is practically replaced by the roller bearing for the coupling bolts, so that the coupling, in its final effect, can be structurally simpler in comparison with known coupling structures. And finally, such coupling contributes to the total function of the drive in its preferred application on friction wheel-epicyclic gear drives.

In a particularly advantageous arrangement of the control curve, it is proposed to equip the latter with a changeable inclination, in order to permit changeable engaging pressure forces complementary to the adjustment of the drive, which forces correspond with the changeable peripheral forces between the planet gears and the outer rings.

In order to take into account this fact, an expedient has been provided, according to which in the application of a coupling on friction wheel-epicyclic gear drives, the mounting the planet gears in the driven disk has been formed as such control curve. In accordance with the present invention, the control curve is removed within the range of the mounting axes of the planet gears in the driven disk.

Furthermore, the planet gear mounting can be used simplified and made more without play, and also a mounting on both sides can be used to advantage.

It is yet another object of the present invention to provide a continuously controllable friction wheel-epicyclic gear drive in which the control curve is provided on the complementary coupling part of the moment coupling in such manner, that it runs from the lowermost point in the direction towards the highermost point of the control curve flatly decreasing and in the last part only rises again, in order to avoid an over-run of the bolts. In order to permit driving of the drive in both rotary directions, the control curve can be formed as a mirror picture towards both sides starting from the head point.

Furthermore, the present invention provides, concerning the construction of the coupling, that the body receiving the coupling bolts, as well as the complementary coupling member which carries the control curve, are set on the same bearing which short circuits the axial forces, which bearing can be formed as a coupling bushing having a flange or the like at one end and a nut on the other end, which is coupled for the joint rotation with the driving shaft and is freely axially adjustable on the latter.

The axial pressure springs, which are known per se, which retain the coupling parts under pretension, and which are received in one half of the coupling, are supported opposite to the other half of the coupling by means of roller bearings rotatable relative thereto, and expedient which likewise is of advantage, because the friction is reduced and the self-locking is opposed.

If now, as it is done in accordance with the present invention, such coupling is applied to a continuously controllable friction wheel-epicyclic gear drive with inner and outer rings, as well as with planet gears disposed therebetween, then the complementary coupling part, which carries the control curve, is formed as inner ring of an inner sun comprising two inner rings disposed axially adjacent each other and coupled for joint rotation as well as axially adjustable relative to each other, which inner sun in turn is mounted on roller bearings for movement in axial direction, and selectively on slide bearings and roller bearings in radial direction relative to the coupling bushing.

Furthermore, the system, formed of the coupling and the inner sun and provided on a common coupling bushing, can be axially freely adjustable relative to the immovable point of the housing of one of the outer rings or in reverse order, under certain circumstances, the bushing can be immovable and the outer rings may be axially freely adjustable.

Summarizing, the advantages of the present invention reside in the fact that by the means of the present invention it is brought about on the one hand, that the coupling operates always safely and under all circumstances in satisfactory manner, regardless of the position of the coupling bolts relative to the control curve, while on the other hand, by the characteristical design of the control curve with a changeable inclination likewise changeable peripheral forces between the planet gears and the outer rings are created. Finally, it is possible, due to the automatic free axial setting of the coupling bushing on the drive shaft that the driving system mounted on this bushing can set itself automatically relative to a set point of the housing, for instance, an outer ring during the first run.

It is further within the scope of the present invention, that the coupling is to be applied not only to friction wheel-epicyclic gear drives with inner and outer rings, as well as with planet gears disposed therebetween and engaging the same, rather the coupling which comprises a drive disc receiving the coupling bolts and a complementary coupling member carrying the control curve can be applied also in connection with other drives with advantage.

Lastly, in a kinematic reversal of the present invention, the control curve having a changeable inclination can be provided also in or on the drive part which normally receives the coupling bolts, while then the coupling bolts find a roller bearing support in or on the complementary coupling part.

With these and other objects in view, which will become apparent in the following detailed description, the present invention will be clearly understood in connection with the accompanying drawings, in which.

Figure 1:
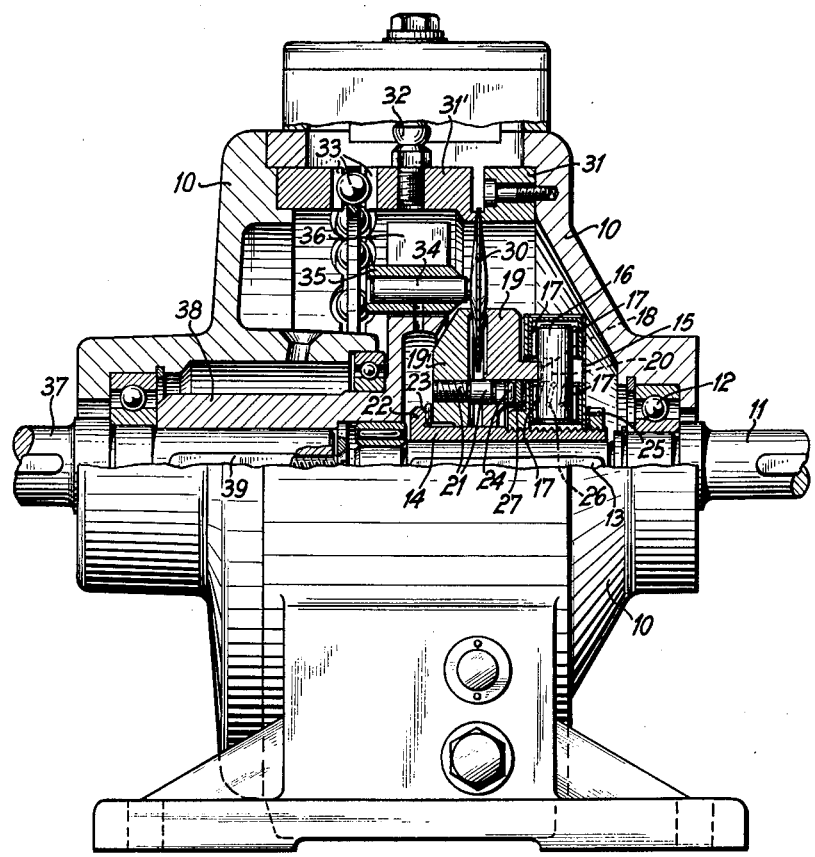
FIGURE 1 is an elevation, partly in section, of an epicyclic gear drive equipped with a coupling.
Figure 2:
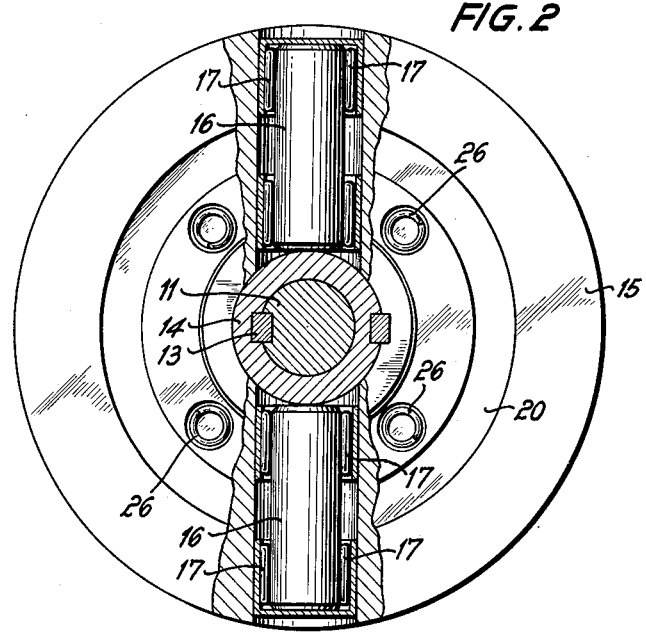
FIG. 2 is an end view, partly in section, of the receiving body receiving the coupling bolts.
Figure 3:
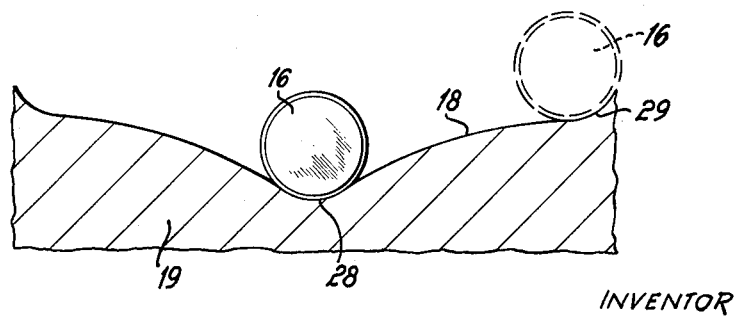
FIG. 3 depicts the control curve having a changing inclination.

Referring now to the drawings, and in particular to FIG. 1, the drive comprises a housing 10 in which a drive shaft 11 is mounted in a bearing 12. A bushing 14, coupled with the drive shaft 11 for joint rotation by means of a feather key 13, is mounted on the same drive shaft 11. The bushing 14 is freely adjustable in axial direction. A disc-like driving body 15, coupled with the coupling bushing 14 serves the purpose to receive bolts 16 of a coupling, which bolts 16 are mounted on needle roller bearings 17. These bolts 16 cooperate with a control curve 18 (FIG. 3) of a counter-coupling part, which is formed, in accordance with the embodiment disclosed in the drawing, of one-half part 19 of an inner sun consisting of two inner rings 19 and 19'. In order to permit the engagement of the bolts 16 with the control curve 18, the driving body 15 receiving the bolts 16 has an annular recess 20 at its entire periphery.

The inner rings 19 and 19' are connected for joint rotation by means of bolts 21 and are additionally engaging the outer periphery on the same bushing 14 of the coupling. These inner rings 19 and 19' are further axially movable relative to each other and are supported by roller bearings 23 and 24, respectively, by engagement of a shoulder 22 at one end of the bushing 14, and by engagement of springs 26 in the driving body 15 receiving the bolts 16. Between the roller bearing 24 and the springs 26 is disposed a bearing ring 27. The driving body 15 receiving the bolts 16 is axially secured relative to the bushing 14 by means of the nut 25. Furthermore, the inner rings 19 and 19' are supported in this embodiment in radial direction on the bushing 14 by means of sliding bearings; they can be supported, however, also on roller bearings. The axial support by means of roller bearings is here by all means required, because very heavy axial forces occur, which would bring about a self-locking by an engagement of sliding bearings.

The control curve 18 (FIG. 3) provided on the counter-coupling part, namely on an inner running ring 19 of the inner sun, and cooperating with the coupling bolts 16, is equipped, in accordance with the present invention, with a changeable inclination in such manner, such that the inclination is flattened from its lowermost point 28 in the direction towards the highest point 29, in order to take into account the greater peripheral forces occurring at certain adjustments between the planet gears 30 and the outer rings 31 and 31' by greater pressure forces. The unwinding of the control curve 18 can be provided, for the purpose of operating in two rotary directions, in form of a mirror picture in relation to a plane extending through the lowest point 28 of the control curve 18. Thus the coupling bolts 16, which are mounted on roller bearings, have the possibility to move freely within the range from the lowermost point 28 to the highermost point 29, without causing any self-locking in view of the small control angles.

The planet gears 30 are in engagement with the inner rings 19 and 19', as well as with the outer rings 31 and 31', of which the outer ring 31 is rigidly secured to the housing 10, while the other outer ring 31' is adjustable relative to the immovable ring 31, for instance, by a conventional adjustment device 32 comprising, for instance, a screw bolt. Between the outer adjustable ring 31' and the housing 10 is disposed a coupling 33, which operates here practically like a roller mounted thread.

The planet gears 30 have on one side, or, under circumstances, on both sides, a bearing pin 34 which is mounted in a sliding bushing 35, which in turn is supported in slots 36 of a driven disk 38 coupled for joint rotation with a driven shaft 37, for instance, by means of a key 39 or the like. The change of the number of revolutions is brought about herein by radial adjustment of the planet gears which is achieved by the change of the distance of the outer rings 31 and 31' relative to each other.

The closed system of mechanical forces is arranged in this drive in the following manner:

The coupling bushing 14 is driven at first by the driving shaft 11 of the drive, which coupling bushing 14 is keyed to the driving shaft 11, and the coupling bushing 14 in turn joins the driving body 15 for common rotation. From the coupling bolts 16, which are mounted on roller bearings in this driving body 15, the driving force is transmitted along the control curve 18 to the complementary coupling member, in this case an inner ring of the inner sun 19 and 19'. In particular, the coupling bolts 16 are, in the planet position, as particularly shown in the drawing, about at their lowermost point 28 of the control curve 18, while during the radial displacement of the planet gears in outward direction, the coupling bolts 16 can roll up to the highest point 29, shown by dotted line in FIG. 3. Finally, the peripheral force is transmitted to the driven disc 38 by means of the planet gears 30 which are in engagement with the inner rings 19 and 19', as well as with the outer rings 31 and 31' and also radially adjustable, the bearing poins 34 of the planet gears 30 being an intermediate member, and the driven disc 38 being keyed for joint rotation with driven shaft 37.

In addition it should be emphasized that the shown and described embodiment constitutes merely an example of the structure of the present invention and is not limited thereto. Rather within the scope of the present invention other embodiments and other applications are possible. This relates to the formation and the design for the moment coupling which may be different from that shown in the drawings, as well as its application in drives which are deviating from the shown friction wheel drive. The direction of the mechanical forces in the closed system can be arranged also in reversed order.

While I have disclosed one embodiment of the present invention, it is to be understood that this embodiment is given by example only and not in a limiting sense, the scope of the present invention being determined by the objects and the claims.

I claim:

1. A continuously controllable friction wheel-epicyclic gear drive comprising
   a housing,
   a drive shaft and a driven shaft,
   an inner sun consisting of at least two inner rings and driven by said drive shaft,
   a clutch disposed between said drive shaft and said inner sun, and
   at least two outer gear rings,
   one of said outer rings being immovably secured to said housing and the other of said outer rings being axially adjustable,
   flat, double-conical planet gears engaging said inner rings constituting said inner sun and said outer rings, and
   a driven disc coupled with said driven shaft,
   said double-conical planet gears being mounted adjustably in radial direction in said driven disc, and said clutch comprising at one side a plurality of coupling bolts supported by roller bearings,
   a receiving body engaging said coupling bolts,
   a complementary coupling member carrying a control curve rotatable relative to said coupling bolts, and said coupling bolts being guided by said control curve of said complementary coupling member.

2. The gear drive, as set forth in claim 1, wherein said receiving body is of substantially disc shape and has radial bores, and
   said coupling bolts are received in said radial bores of said receiving body.

3. The gear drive, as set forth in claim 2, wherein said receiving body receives at least two of said coupling bolts,
   needle bearings supporting said coupling bolts, and said receiving body has an annular recess opposite said control curve,
   said annular recess being adapted to receive said control curve.

4. The gear drive, as set forth in claim 3, which includes
   at least two needle bearings for each of said coupling bolts, and
   said needle bearings are disposed near the ends of said bolts leaving a needle-free space in the center thereof.

5. The gear drive, as set forth in claim 1, which includes
   axial pressure springs having a pretension between said receiving body and said complementary coupling member and being axially supported on roller bearings towards said complementary coupling member.

6. The gear drive, as set forth in claim 1, wherein said control curve has a changing inclination.

7. The gear drive, as set forth in claim 6, wherein the rising portion of said control curve is flattened from its lowermost point in the direction towards its uppermost point, such that during rotation of said driven shaft at a low number of revolutions said coupling bolts engage the more flattened portion of said control curve closer to said uppermost point of said control curve, while during rotation of said driven shaft at a greater number of revolutions said coupling bolts engage the steeper portion of said control curve closer to the lowermost point of said control curve.

8. The gear drive, as set forth in claim 1, wherein said control curve is formed of two branches, and each of said branches is a mirror picture of the other of said branches relative to a plane extending through the lowermost point of said control curve.

9. The gear drive, as set forth in claim 1, wherein said receiving body and said complementary coupling member are supported on a common bearing member short-circuiting the axial forces, and said common bearing member is axially adjustable.

10. The gear drive, as set forth in claim 9, wherein said common bearing member comprises a bushing having a shoulder at one end and a nut at its other end.

11. The gear drive, as set forth in claim 10, wherein said bushing is keyed to said drive shaft and axially movable relative thereto, as well as automatically adjustable.

12. The gear drive, as set forth in claim 1, wherein said complementary coupling member receives said coupling bolts, and
    said driven disc carries said control curve.

13. The gear drive, as set forth in claim 1, wherein said complementary coupling member comprises an inner ring formed as an inner sun and consisting of two axially adjacent disposed inner ring parts joined for common rotation, as well as axially adjustable relative to each other.

14. The gear drive, as set forth in claim 13, which includes
    a bushing keyed to said driving shaft and having a shoulder at one end, and
    said inner ring parts of said inner sun are supported by roller bearings in axial direction relative to said shoulder of said bushing and in radial direction selectively by slide and roller bearings, respectively.

15. The gear drive, as set forth in claim 1, which includes
   a bushing keyed to said driving shaft and carrying said clutch and said inner rings, constituting a first element, and
said outer rings constituting a second element, and
one of said elements being freely adjustable in axial direction.

References Cited in the file of this patent

UNITED STATES PATENTS

| | | |
|---|---|---|
| 1,585,140 | Erban | May 18, 1926 |
| 1,770,408 | Jacobsen | July 15, 1930 |
| 2,081,824 | Lambert | May 25, 1937 |
| 2,209,497 | Winger et al. | July 30, 1940 |
| 3,011,363 | Kirschey | Dec. 5, 1961 |